(12) United States Patent
Zhao et al.

(10) Patent No.: US 8,533,152 B2
(45) Date of Patent: Sep. 10, 2013

(54) SYSTEM AND METHOD FOR DATA PROVENANCE MANAGEMENT

(75) Inventors: Jing Zhao, Los Angeles, CA (US); Fan Sun, Los Angeles, CA (US); Carlo Torniai, Playa del Rey, CA (US); Amol B. Bakshi, Pasadena, CA (US); Viktor K. Prasanna, Pacific Palisades, CA (US)

(73) Assignee: University of Southern California, Los Angeles, CA (US)

( * ) Notice: Subject to any disclaimer, the term of this patent is extended or adjusted under 35 U.S.C. 154(b) by 510 days.

(21) Appl. No.: 12/275,877

(22) Filed: Nov. 21, 2008

(65) Prior Publication Data

US 2010/0070463 A1  Mar. 18, 2010

Related U.S. Application Data

(60) Provisional application No. 61/098,137, filed on Sep. 18, 2008.

(51) Int. Cl.
*G06F 17/30* (2006.01)
(52) U.S. Cl.
USPC .............................. 707/608; 705/7.27
(58) Field of Classification Search
USPC ............................... 707/608; 705/7.27
See application file for complete search history.

(56) References Cited

U.S. PATENT DOCUMENTS

| | | | |
|---|---|---|---|
| 5,193,185 A | 3/1993 | Lanter | |
| 5,721,919 A | 2/1998 | Morel et al. | |
| 6,173,404 B1 | 1/2001 | Colburn et al. | |
| 6,230,212 B1 | 5/2001 | Morel et al. | |
| 6,343,295 B1 | 1/2002 | MacLeod et al. | |
| 6,356,901 B1 | 3/2002 | MacLeod et al. | |
| 6,434,558 B1 | 8/2002 | MacLeod et al. | |
| 7,117,219 B1 | 10/2006 | Powers et al. | |
| 7,493,570 B2* | 2/2009 | Bobbin et al. | 715/800 |
| 7,739,089 B2* | 6/2010 | Gurpinar et al. | 703/10 |
| 2002/0019827 A1 | 2/2002 | Shiman et al. | |
| 2005/0165865 A1 | 7/2005 | Farmer | |
| 2005/0289061 A1 | 12/2005 | Kulakowski et al. | |
| 2006/0053172 A1 | 3/2006 | Gardner et al. | |
| 2006/0080369 A1 | 4/2006 | Razdow et al. | |
| 2006/0184563 A1 | 8/2006 | Potter | |
| 2006/0242180 A1 | 10/2006 | Graf et al. | |
| 2006/0294151 A1 | 12/2006 | Wong et al. | |
| 2007/0016624 A1 | 1/2007 | Powers et al. | |
| 2007/0061353 A1 | 3/2007 | Bobbin et al. | |
| 2007/0088957 A1 | 4/2007 | Carson | |
| 2007/0266166 A1 | 11/2007 | Cohen et al. | |
| 2008/0040388 A1 | 2/2008 | Petri et al. | |
| 2008/0120281 A1 | 5/2008 | Marceau et al. | |

OTHER PUBLICATIONS

Biton et al., "Zoom*UserViews: Querying relevant Provenance in Workflow System", Copyright 2007, VLDB 07 Sep. 23-28, 2007, pp. 1366-1369.*

* cited by examiner

*Primary Examiner* — Hung Q Pham
(74) *Attorney, Agent, or Firm* — Pillsbury Winthrop Shaw Pittman LLP

(57) ABSTRACT

A method for deriving data provenance information corresponding to a workflow process having lower-level workflow processes includes deriving internal provenance information for data pertaining to at least one of the lower-level workflow processes, identifying data objects that are shared between at least a pair of lower-level workflow processes to derive external provenance information for the identified data objects, in response to a user-submitted query, using the internal and external provenance information to retrieve the data provenance information for the workflow process, and outputting the derived data provenance to a user.

12 Claims, 8 Drawing Sheets

-- Application
-- Data Object

-- Application
-- Data Object

SYSTEM AND METHOD FOR DATA PROVENANCE MANAGEMENT

CROSS-REFERENCE TO RELATED APPLICATION

This application claims priority to U.S. Provisional Application No. 61/098,137 filed on Sep. 18, 2008, the contents of which are incorporated herein by reference in their entirety.

BACKGROUND

1. Field of the Invention

The present invention relates generally to systems and methods for tracking provenance of data objects through workflows and more particularly to the application of such systems and methods to multiple, related workflows.

2. Description of the Related Art

Provenance has been widely acknowledged and discussed in the e-Science field. In this regard, articles have been written about provenance collection, modeling, representation, storing, and application.

The tasks, procedural steps, organizations or people, required input and output information, and tools needed for each step in a business process constitute a workflow. Depending on the nature of a particular enterprise, the workflow may be performed using local or distributed resources and may be performed using various software applications which may be referred to as workflow engines.

In certain workflows, the workflow engine itself includes functionality such that provenance information is automatically logged during the workflow execution. In this regard, such a workflow engine may include different levels: process level, data level, organization level and knowledge level. This type of system may further include semantic web technologies to link domain knowledge with the provenance information. The information so developed can be used for data quality verification, for example.

In another example, the workflow is defined in a proprietary data language and cataloged. A schema, or provenance model, can be queried by a user to review the provenance data for a particular workflow product.

In these provenance projects provenance data capturing schemes are generally tightly coupled with their workflow execution environment. Provenance information can be captured automatically during the workflow execution because of the existence of a workflow engine. However, when running workflows in an open, distributed environment, such an approach may not be practical. In this regard, one approach has been to wrap each workflow component as a web-service, and to define an open protocol among these web-services to capture provenance.

This approach, however, has not generally been applicable to provenance beyond a single workflow instance. It has not generally been able to integrate provenance across workflow instances or to capture an integration relationship between workflow instances.

To address the issue of multiple workflow instances, an approach has been applied to different instances of a common workflow that may have minor variations. In this approach, differences between instances of a single workflow are monitored and collected, but this approach has not been applied to different workflows.

SUMMARY

Aspects of embodiments of the present invention provide a method of deriving data provenance information corresponding to a workflow process, such as a computer implemented workflow process, having a plurality of lower-level workflow processes. The method includes automatically deriving internal provenance information for data pertaining to at least one of the lower-level workflow processes, automatically identifying data objects that are shared between at least a pair of lower-level workflow processes to derive external provenance information for the identified data objects, using the internal and external provenance information to automatically retrieve the data provenance information for the workflow process, and outputting the derived data provenance to a user. In some embodiments, the using the internal and external provenance information is performed in response to a user-submitted query.

Aspects of embodiments of the invention may include a computer-readable medium encoded with computer-executable instructions for performing the foregoing method or for controlling the foregoing system.

Aspects of embodiments of the invention may include a system incorporating the foregoing system and configured and arranged to provide control of the system in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
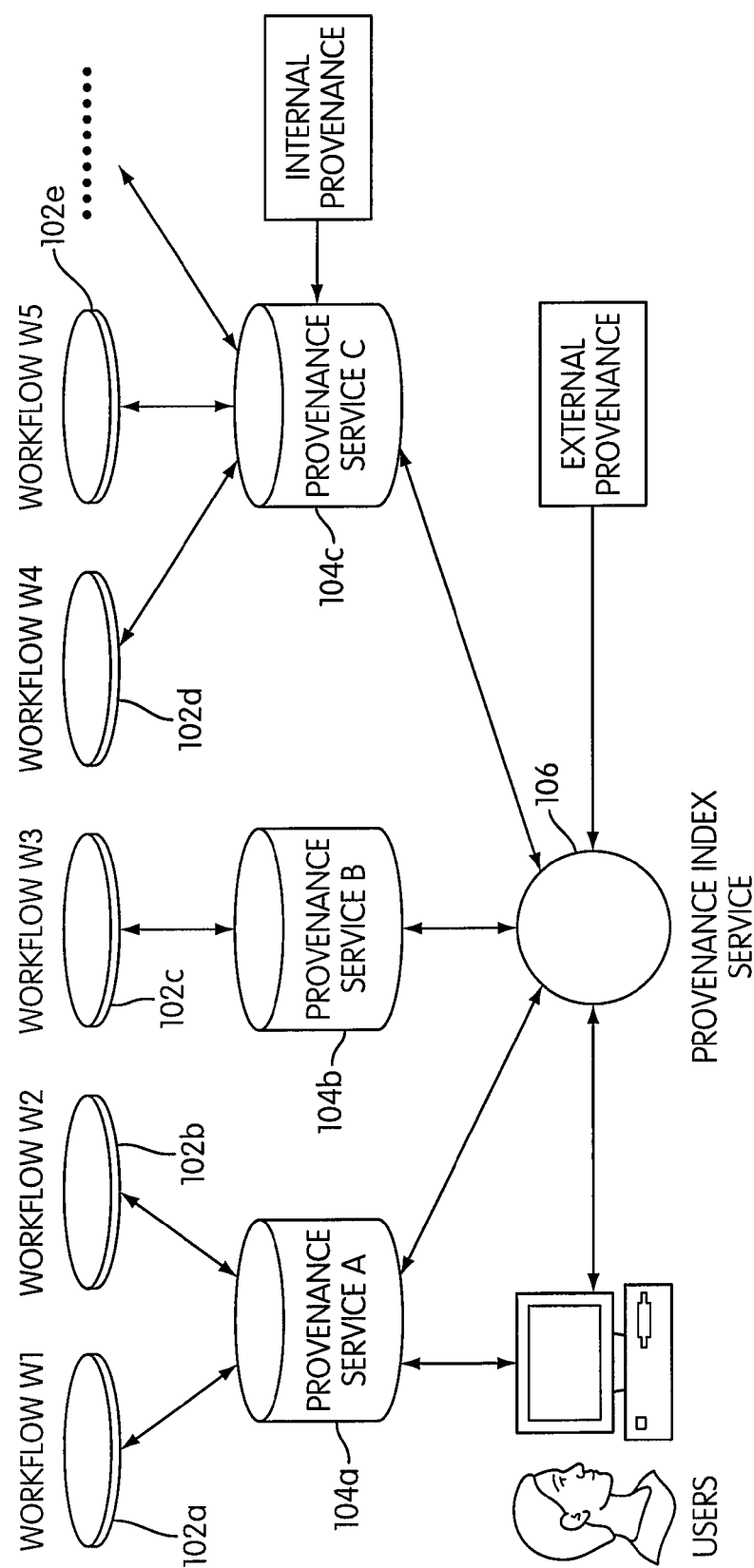
FIG. 1 is a schematic diagram of an example of an architecture of a provenance framework in accordance with an embodiment of the invention.

As noted above, provenance has broad application to data and workflow intensive processes. It is a particularly important issue, for example, in hydrocarbon reservoir management workflows where various data objects are involved, including uncertain reservoir models, reservoir measurements, simulation results, and production schedules. By way of example and not limitation, embodiments of the present invention are described in the context of hydrocarbon reservoir management workflows. Other areas in which aspects of the present invention may find application include, for example, distributed organ transplant management, electronic healthcare records, digital art and/or literature libraries, and a variety of engineering data analysis applications such as aerospace research and development.

Returning to the example of hydrocarbon resource management, in both the exploration and production environments domain experts may prefer to be able to trace these data objects, so as to know when, where, how and by whom these data objects were created. This information can help domain experts to determine a measurement of the trustworthiness of the data objects, so that they can achieve good data quality control and data reliability maintenance. For example, it may be useful to distinguish the case where subsurface conditions are modeled based on pseudo cores versus cases where conditions are measured by actual well logging as a domain expert may place greater confidence in logged data over modeled data. Data provenance, or lineage, can provide domain experts with this kind of information. When used in quality control applications, the provenance information may include ancestral data objects of the data, settings and intermediate results of workflows which create the data, etc. With data provenance domain experts can go back through the whole derivation history of data objects, check repeatability of the workflow, debug workflow executions, find the origins of errors, and learn whether there are data accuracy propagations within or between workflows.

A typical reservoir operation setting involves the use of many legacy tools which were not designed to interact with each other. Among the most important of these tools are the simulators for the reservoirs, surface facilities, etc. Legacy data sets have various data formats including unstructured (ASCII), structured data in XML format and databases, data only accessible through specialized API invocations, and the like.

Furthermore, typical oilfield operations involve multiple classes of users and stakeholders, with different specializations and roles across departmental boundaries. As will be appreciated, these users may have different requirements, different terminology and vastly different workflows, both from an input and an output perspective.

As a result, integration of reservoir management involves both application integration and data integration. In a typical reservoir management workflow, domain experts use data objects created by other applications or workflows as input, and integrate a set of applications (which may have been wrapped as web-services) to produce output data objects through some predefined steps. The output data may be used by other applications or workflows as input. A set of such workflows may be integrated together to form a higher level workflow. A higher level workflow usually involves the work of multiple departments and may last for a long time (e.g., on the scale of a year or more).

In an embodiment of the present invention, in order to compose provenance from individual workflows to get an integrated provenance view that combines together multiple workflows, both provenance within a workflow and across workflows are collected in accordance with a provenance integration framework. In this approach, the term internal provenance is used to refer to provenance information derived from within a workflow instance, which includes data derivation relationship, workflow settings, and intermediate results, etc. Likewise, external provenance is used to indicate the provenance information derived from data that is passed between workflows. The external provenance provides information regarding which workflows the input/integrated data objects come from. External provenance pertains primarily to the input and output of workflows, and not to the internal data of a workflow. By managing both internal and external provenance, the inventors provide a system and method that may allow a user or a domain expert to obtain a comprehensive provenance view. Particular examples of internal and external provenance are discussed further, below.

For a particular workflow, a provenance model may be defined to specify what provenance information should be collected, and to convert unstructured raw provenance data into structured provenance information. That is, it may include definitions, formats, relationships and operations for provenance information. A provenance model can be considered to represent domain experts' view about the workflow and its data objects. It may be built based on the domain and the use of the provenance information.

As applied to reservoir management, wherein workflows may be created by different departments that may focus on different domains (e.g., reservoir engineering, production engineering, facilities engineering, and business management), diverse provenance models may be developed for the workflows' internal provenance. These provenance models may also lead to different approaches to storing provenance information (e.g., resource description framework repositories or relational databases).

Considering the large number of provenance models and continuity of developing new provenance models, it is not generally efficient or scalable to unify these internal provenance models. When domain experts retrieve multiple workflows' internal provenance (which are under a common higher level workflow), some methods should be provided to map data objects under different provenance models.

The framework in accordance with an embodiment of the present invention may include functionality for capturing data provenance in legacy tools. In an embodiment, this functionality operates by analyzing the log of legacy tools to detect and annotate the data derivation relationship involved in the legacy tools. This functionality may be implemented, for example, in a provenance web-service module.

In a particular example of external provenance, a data object A is used by a first workflow W1 as an input object. Data object A may have been created by another workflow W2, thus there is a need to connect provenance captured in the two different workflows together. Because A may, in some cases, have been imported into W1 manually (e.g., through copy & paste), downstream users may not know which workflow created it. If the provenance data is stored in a distributed way, users may also have difficulty determining the provenance of the data object A.

In an embodiment of the present invention, a framework for supporting diverse provenance models and easing provenance integration is provided. As schematically illustrated in FIG. 1, a number of workflows 102a-102e, which are in general different from each other, form the workflow layer. For each workflow, or for a number of related workflows, a provenance model and its corresponding provenance data store, or repository, may be wrapped as a provenance service 104a, 104b, 104c, and a service oriented architecture (SOA) may be used to aggregate provenance services in a provenance index service 106. In this way, a newly introduced provenance service involving a corresponding new provenance model may, in principle, be integrated into the existing framework. Users may submit provenance query requests to ask for the internal provenance about a particular data object or group of data objects, which, in general, are themselves outputs of workflows whose provenance is stored in the provenance repository. As illustrated in the figure, a user can interact with the provenance index service directly to browse the external provenance, or interact directly with the provenance services.

Within the framework, a provenance index service is provided. The provenance index service can connect multiple workflows' internal provenance by mapping their input/output data objects, and locate users' provenance requests to corresponding provenance services. External provenance information may be published into the provenance index, and used to connect distributed internal provenance together. A set of models including, for example, a semantic model based on domain knowledge is defined to express the external provenance and the provenance index.

In a particular example, a framework in accordance with an embodiment of the invention can be applied to oilfield management. For the purposes of this example, a number of relevant terms may be defined: A well is an entity that produces oil, water, and gas. A block is a set of wells. The production of a block is the sum of the production of its constituent wells. The oil, water, or gas production for a well or a block is often represented by a "recovery curve" or a "decline curve" for that well or block. The production should be under the constraints of surface facility capacity, which refers to the facility and export system capacities over the life of the reservoir.

A generic workflow used to forecast and optimize future oil production can then be described. In general, the workflow has five input data sets: block history data, well production data, block data, recovery curve data, and surface facility constraints data. Block history data depicts the historical production data of a block which is collected from the real production history. Well production data holds the production information for a well. Because the workflow does the forecasting at the block level, well production data of the wells which belong to a block will be aggregated in another input data structure called block data. Some other information about the block's property is also included in block data. The well production data and the block data can both be seen as data about the reservoir deliverability and well capacity. The example workflow combines these data with data of surface facility constraints, which is also an input of the workflow, to forecast and optimize the future production.

Figure 2:
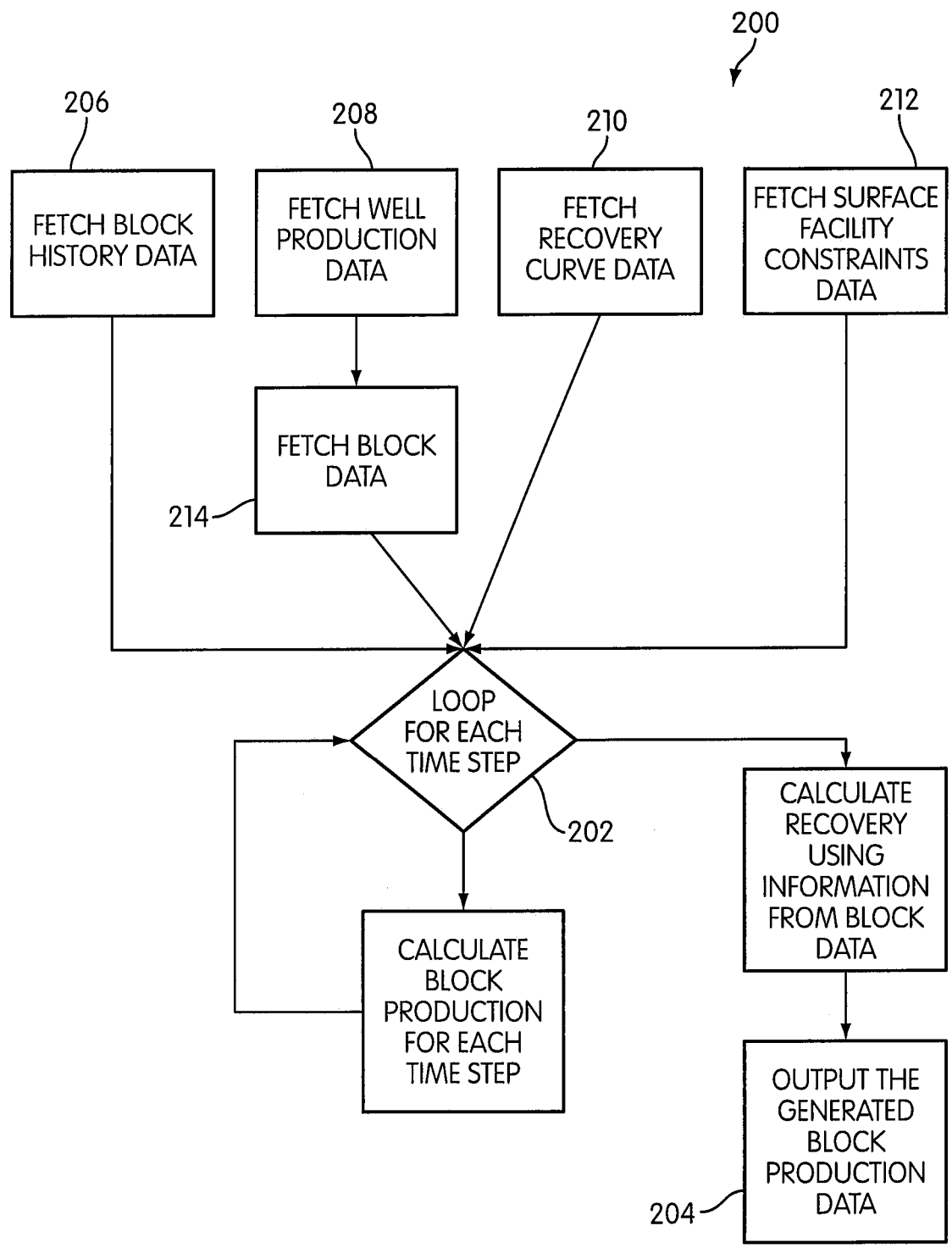
FIG. 2 is a flowchart illustrating an example of a forecasting workflow in accordance with an embodiment of the invention.

FIG. 2 depicts a general process for the example workflow 200. In each time step 202 of a control loop, the block production result is forecast up to that time. As a final result 204, the workflow will provide only a final optimization and forecasting result, but the data involved in each time step may likewise have value as an intermediate result. Domain experts may have a need to access these data so that they are able to review the workflow and check the data's quality and trustworthiness. Therefore, in an embodiment, the intermediate results may comprise internal provenance information for this workflow. Because this data may become quite large, it may be stored, for example, in a separate relational database (not shown). For this example, then, a number of relational database tables comprise the internal provenance model, and time step can be used to distinguish different data records.

The inputs, 206, 208, 210, 212, 214, may also involve complex processes. For example, reservoir deliverability and well capacity data, including well production data 208 and block data 210, can be generated by a number of different methods, implemented together or in the alternative. Each method may itself involve several workflows which include, for example, lab tests, seismic simulators, and production simulators, etc.

According to different accuracy and timeliness requirements, domain experts may choose different methods to generate the reservoir deliverability and well capacity data. Meanwhile, complete surface facility constraints data generally take into account factors like fluid properties, surface equipment, and even market and transportation conditions. All these workflows are under the direction of a higher level workflow which employs integrated workflows or applications to achieve overall system optimization. In this case, data will generally flow across workflows belonging to different departments, that is, data objects may be shared between workflows. The origin of the input data of different workflows forms a basis for determining external provenance. For example, the external provenance service of the forecasting workflow may record which other workflow instances create the data objects contained in well production data 208, block data 214, and surface facility constraints 212.

In order to collect provenance information from applications that are not previously designed for providing it, methods to annotate and extract data relationship from logs generated by legacy applications may be defined. In this regard, an ontology of a provenance model is first defined to describe the formalized provenance information. A extended semantic rich workflow model is used to capture provenance in a workflow context. Such context provides semantic information for provenance annotation. A workflow instance detection algorithm is then used to identify the workflow instances within which provenance can be annotated and extracted.

The provenance index service can be configured to map the input data objects of a workflow instance to the output data objects of other workflow instances. Moreover, it may record the addresses of provenance services so that domain experts can use it to locate any provenance service.

By way of example, in use, a user may track data provenance using provenance service 104a first, and find that a particularly important data object is imported from another workflow and that its provenance information is not stored in the repository of 104a. In this event, the provenance service 104a may be configured to contact the provenance index service 106, and to inquire which workflow created the data object, and from which provenance service the provenance information can be retrieved. The provenance index service 106 will reply to service 104a by providing the address of the target provenance service, for example, service 104b, along with a formatted query suitable for interrogating service 104b.

Once the reply is received, 104a contacts 104b submitting the formatted query it received from the index service 106. Upon receiving the reply from 104b, the result may be provided to the user. As connections are built up through responses to user queries, the additional connection information may be cached or placed into permanent storage as part of the index service so that the same data mapping will be available for future requests. The user may then continue to query the system until satisfied that sufficient provenance information has been obtained.

While this embodiment makes use of one node that can be considered to be central, it should not become a bottleneck because it does not store all the provenance data records themselves. Instead of including all of the provenance data within the index service 106, it only includes a portion of the data (for example, metadata) and the external provenance for each provenance service. That is, data mapping is done on-demand, rather than mapping the entire model from the beginning. This means that, in general, storage and computational costs for the index service 106 service can be relatively low.

As new workflows are introduced into the framework, respective new provenance services along with their respective new provenance model and repositories can be added into the provenance framework. After a new provenance service is built, the service administrator will register the new service to the provenance index service with some required information, which includes, for example, the address of the service, the involved workflows, the input and output data objects of the workflows (i.e., the external provenance), and the querying interface of the service, etc.

Where a particular workflow does not include built-in provenance logging, other approaches may be used to derive internal provenance for that workflow. As an example, the software used to perform the workflow may include a logging function that does not itself track provenance or natively provide for extraction of provenance information. In this case, data relationship rules can be used to extract provenance information.

For a particular workflow, a set of data relationship extraction rules may be defined based on an understanding of the various processes that make up the workflow. By way of example, an upscaling workflow is one in which a fine scale grid (such as a permeability model for a subsurface region) is converted into a coarse scale grid. As will be appreciated, such upscaling can provide a reduced computational requirement for flow modeling calculations.

Applied to the upscaling workflow example, a rule can be defined $M_1$: <Upscaling, grid_A, grid_B>→derives, where upscaling is the workflow, grid_A is the fine scale grid, grid_B is the coarse scale grid and derives is the relationship (i.e., grid_B is derived from grid_A). Once a suitable set of extraction rules is created for a given workflow, it may be applied to the workflow and internal provenance information may be derived.

The provenance index service 106 may include, for example, three models, a data model, a domain model and a provenance service model.

The data model may be defined as a schema for the external provenance. Data objects and workflow instances are defined in this model. Furthermore, the data model is used to match data objects from different workflows.

The domain model may be implemented as a semantic model which expresses the domain knowledge contained in provenance information. Domain entities and their relationships may be defined in this model, and may be mapped to data objects captured in provenance information. In this way domain experts who take charge of different workflows can use common vocabulary to discuss external provenance information.

The provenance service model may be used to capture the semantics of provenance services so that they can be located and invoked. This model may be imported into the data model so as to express the relationships between workflows and provenance services.

Figure 3:
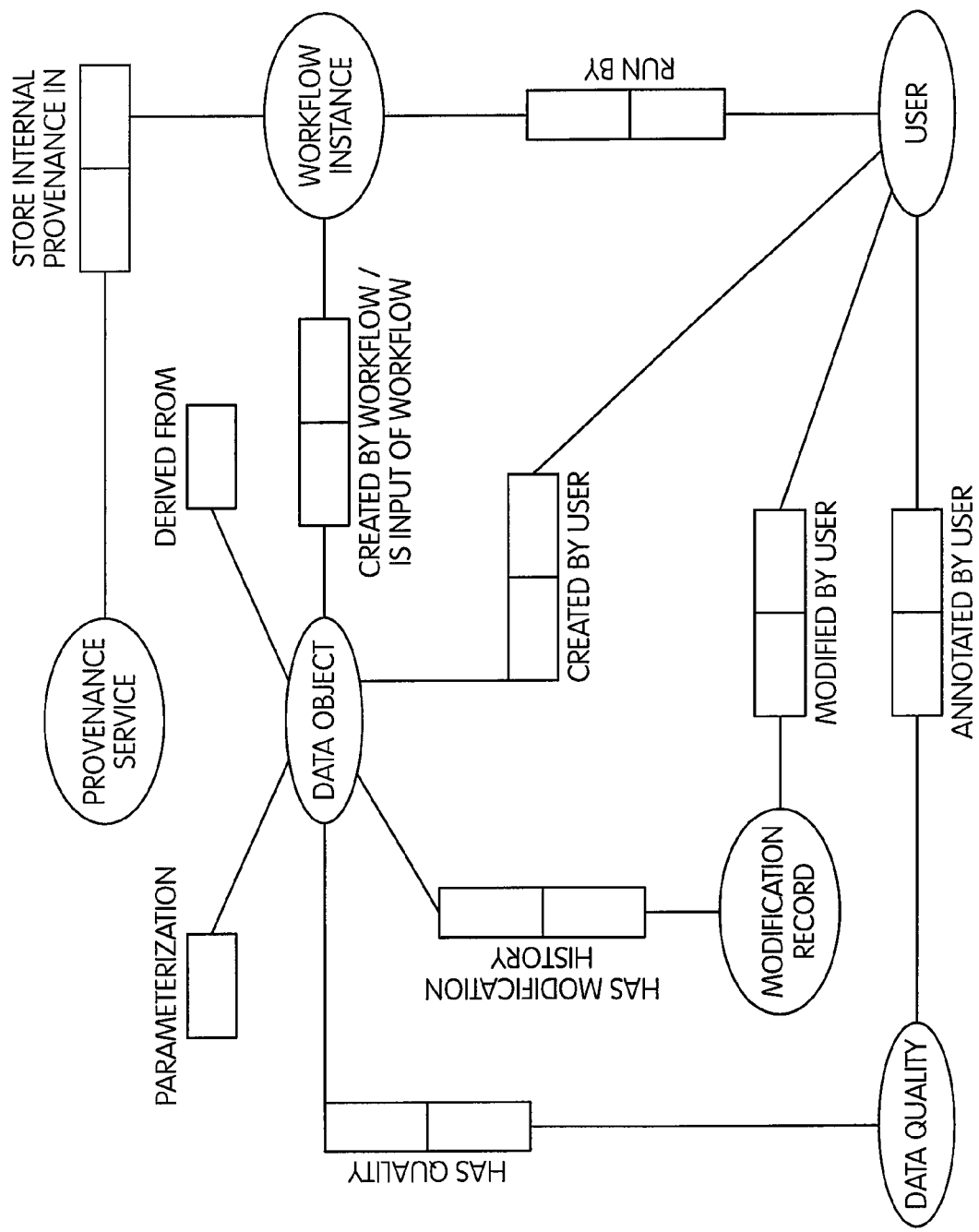
FIG. 3 is a schematic illustration describing an external provenance schema in accordance with an embodiment of the invention.

In general, an ontological approach may be used to define the provenance service models. One schema for defining the ontology is illustrated in FIG. 3. This schema illustrates an example of a set of input/output relationships between data objects and workflow instances.

In this schema, the model records who runs aspects of a workflow and who, or what process, creates the data objects. This information can be used, for example, to evaluate quality based on known information regarding the creator. Furthermore, it may be used to facilitate contact between domain experts in one department with the person who ran the workflow where an object pertains to a workflow of another department.

In the example of reservoir management workflows, especially in some simulation workflows, domain experts may adjust a simulator model's setting to calculate a group of simulation results. By comparing these results they can decrease the uncertainty in the simulation. In this case, the "parameterization" relationship, illustrated in the upper left corner of the schema, to capture the relationship among these results. Likewise, from the parameterization relationship a workflow's evolution history may be observable. Because an important use of provenance information is for data quality control, data quality (lower left corner) may be defined in this schema.

Identification of data objects that are used in multiple workflow instances, a five dimensional identification tuple can be assigned: $D=<N_e, N_i, W, S, T>$ in the data model where $N_e$ is the data object's name/ID defined in external provenance (i.e., a "public" name in the provenance index), $N_i$ is the data object's name/ID defined in some internal provenance (which can be seen as a "private" name of the data object), W is the workflow instance in which the data object's provenance information is captured, S is the provenance service which stores W's internal provenance, and T indicates the relationship between the data object and the workflow instance (input or output).

In this example, $N_e$ and $N_i$ may be not the same because a data object may have a different name/ID in a given workflow's internal provenance. However, because each data object has only one "public" name $N_e$ in the provenance index, we can link multiple tuples with the same $N_e$ so as to match the same data objects appearing in different workflows.

The domain model contains an ontology that models the domain entities in reservoir management. Data objects contained in external provenance are mapped to this domain ontology. For the example described above, block, well and their containment relationship are defined in the ontology, and these concepts and relationships may be mapped to well production data and block data. With the help of this domain model domain experts can understand the data objects from the domain level.

In the model, a 4-tuple $D_o=<K, N_d, C, P>$ may be used to define a domain object where K is the kind/class of the domain object, $N_d$ is the name of the domain object, C is a list of domain objects $D_o1, D_o2, D_o3, \ldots$ which are contained by $D_o$, and P is the domain object which contains $D_o$. In this tuple, C and P indicate the children-parent relationships among domain entities. Other relationships among domain objects may be defined. For example, the tuple $R=<D_d, D,>$ may be used to express relationships in which $D_d$ and D, are the two domain objects between which the relationship is acting.

The provenance service model includes an address of the service and interfaces of the service. As described above, users invoke the interface to retrieve internal provenance from a provenance service located in a certain address. The interface provides a list of parameters for users to specify the particular internal provenance of interest. Referring again to the forecasting workflow example, domain experts may not want to check the whole forecasting process. Instead, they may only want to check the intermediate results in one period of forecasting time. In this regard, functionality can be included that allows domain experts to use a parameter in the interface to specify this checking period. Likewise, for different data objects the same provenance service may provide different interfaces.

A 3-tuple $S=<N_S, A_S, I>$ may be used to present the provenance service model where $N_S$ is the name of the provenance service, $A_S$ is the address of the service, and $I=I_1, I_2, I_3, \ldots I_i$ defines a list of interfaces 1-i. For each interface $I_i$, a 2-tuple $I_i=<D, P>$ where $D=D_1, D_2, D_3, \ldots$ is the list of data objects whose provenance can be retrieved by using the interface $I_i$ and $P=P_1, P_2, P_3, \ldots$, where each $P_i$ is a 2-tuple<$N_i,V_i$> and P represents the parameters of the interface.

In an example of operation of an embodiment, each provenance service is initially registered in the provenance index service. When a workflow instance (e.g., the forecasting workflow described previously) is processed, the internal provenance is recorded in the provenance repository (which may be implemented as a relational database for the forecasting workflow) of a respective provenance service. Meanwhile, information pertaining to the workflow instance (e.g., the user who run the workflow) and the input and output data objects are sent to the provenance index. The external provenance information is modeled using the ontology schema defined above, for example. In the forecasting workflow example, the external provenance information may include information about the time and users of the workflow processing, and the data objects contained in the five input data sets (i.e., block history data, well production data, block data, recovery curve data, and surface facility constraints data) and the output data set (i.e., the forecasting production result).

If a domain expert only wants to learn the provenance information at a coarse level, external provenance may be retrieved from the provenance index directly. For example, from the external provenance recorded in the forecasting workflow, domain experts can learn what data objects and what workflow instance created the specific forecasting production result. They can also retrieve the external provenance about the well production data from the provenance index service to learn the general process of generating well production data. If, however, the domain expert wants to get the detailed provenance about the forecasting production result, the data matching functionality of the provenance service index may be used to query other provenance services and obtain the internal provenance about those input data sets. The domain expert can repeat this process so as to track provenance across workflows. Likewise, internal provenance may be customized by specifying the parameters of the provenance service interface.

In a particular embodiment, a relational database such as Oracle® is used to store the internal provenance of the forecasting workflow. In a typical forecasting workflow, a simulator that calculates forecasting production results for each month of the forecasting period forms the nucleus. As intermediate results (and internal provenance data) both the input and output data objects of the simulator for each month are recorded as relational database table. As noted above, these intermediate results can be significant for domain experts to judge the data quality and debug the forecasting simulator. For example, a table which uses <BlockName> as the key is used to store the static (i.e., unchanged over the forecast time frame) property values of the blocks. Complementarily, a table with the key <BlockName, Time> is used to store dynamic property values of blocks. These two tables together store the data objects in the block level. For the well level, another two tables with the keys <BlockName, WellName> and <BlockName, WellName,Time> are used to store the corresponding well level static and dynamic data objects.

The provenance repository of the forecasting workflow is wrapped as a web service using Apache Axis2. The provenance service provides an interface though which users can retrieve the provenance information of a specific data object. By giving different parameter values users can even specify the level and granularity of the provenance information. For example, users can check the intermediate results for a block or just a well in as short as one-individual-month time or as long as several years' time.

After the processing of one workflow instance, a provenance service will annotate the domain concepts defined in the domain model to the workflow's input/output data objects, and publish these data objects and the workflow instance's settings to the provenance index service as external provenance information. Web ontology language (OWL) is used in the provenance index service to implement the semantic models, while a Java-based semantic web framework such as Jena is used as the inference engine. For the provenance service model the OWL-S ontology is used to represent web-service descriptions. Data records are written as ontology items and may be stored in an ontology database.

Figure 4A:
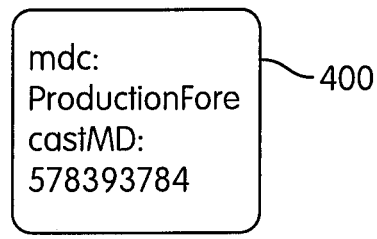
FIGS. 4a-4g illustrate an embodiment of a graphical representation of data provenance information for an example forecasting production workflow.
Figure 4B:
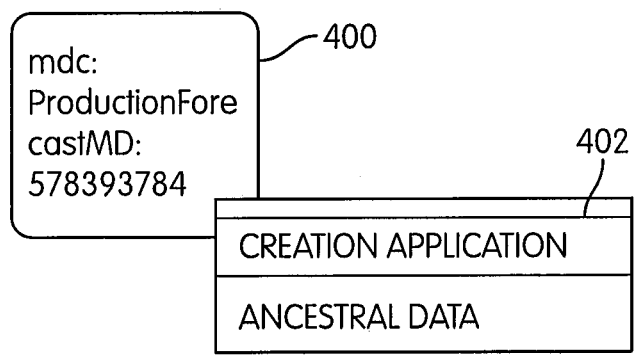

An example of a graphical user interface in accordance with an embodiment of the invention is illustrated in FIGS. 4a-4g. In the example, a forecasting production workflow results in the generation of a data object 400 that in this example represents the result of the forecasting. A user wishing to determine the provenance of the data object 400 can click (e.g., right click) on the data object 400, opening a menu 402 that allows for selection of what type of provenance information the user would like to see. As seen in FIG. 4b, for example, the menu may allow for determination of the application used to create the data object or the data that was used by that application.

Figure 4C:
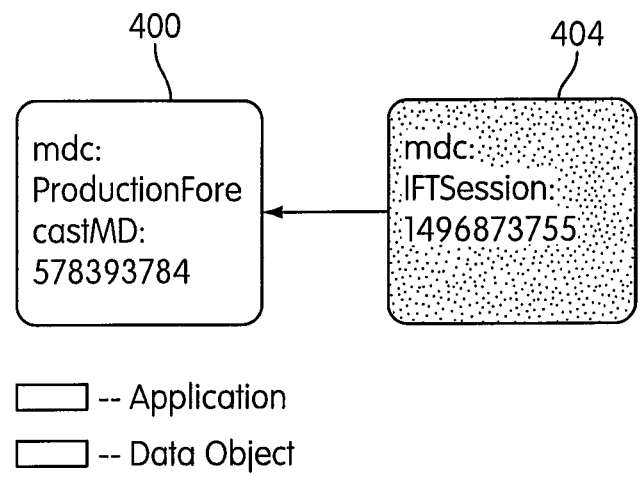
Figure 4D:
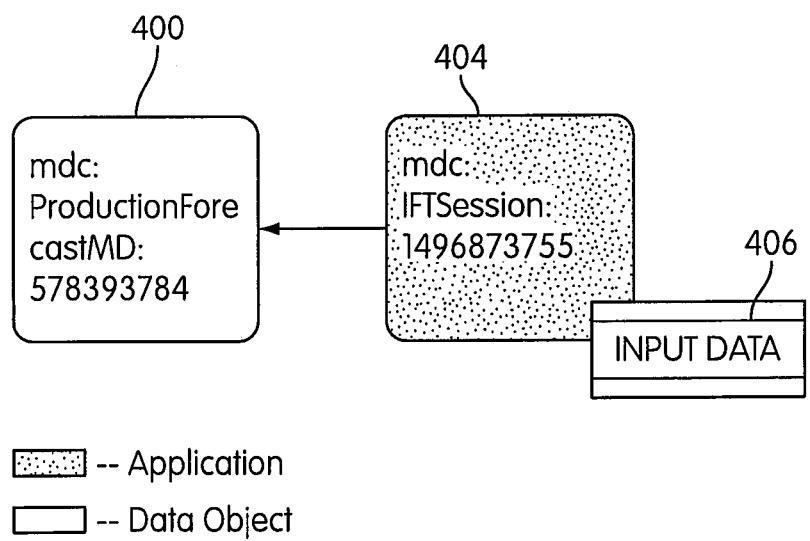

FIG. 4c graphically illustrates the data object 400 and its connection with the application 402 (in this case a forecasting workflow session) that was used to create it. FIG. 4d, in turn, shows a menu item (again, accessed by clicking, for example) 406 that provides a link to the input data used in the forecasting workflow.

Figure 4E:
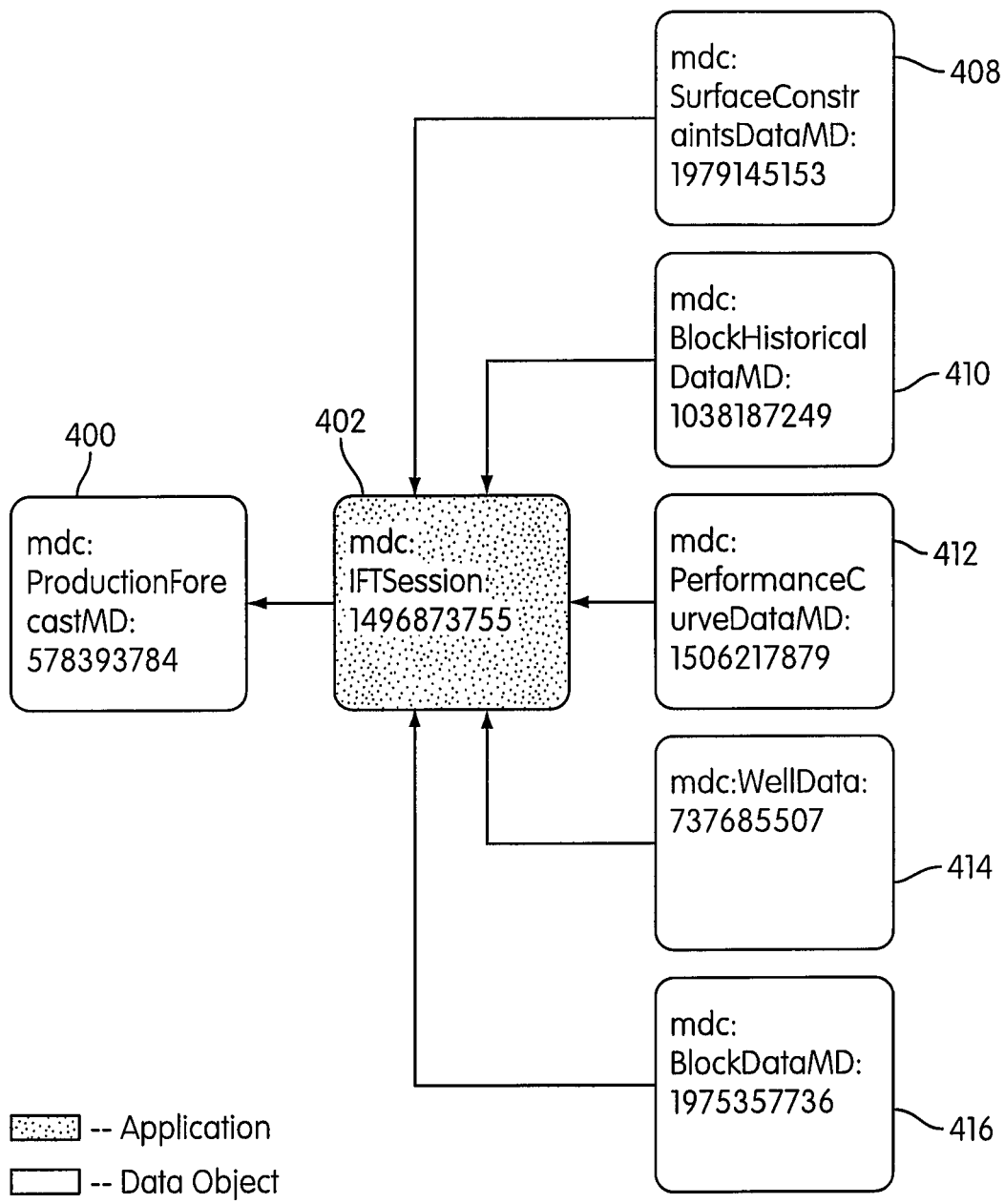
Figure 4F:
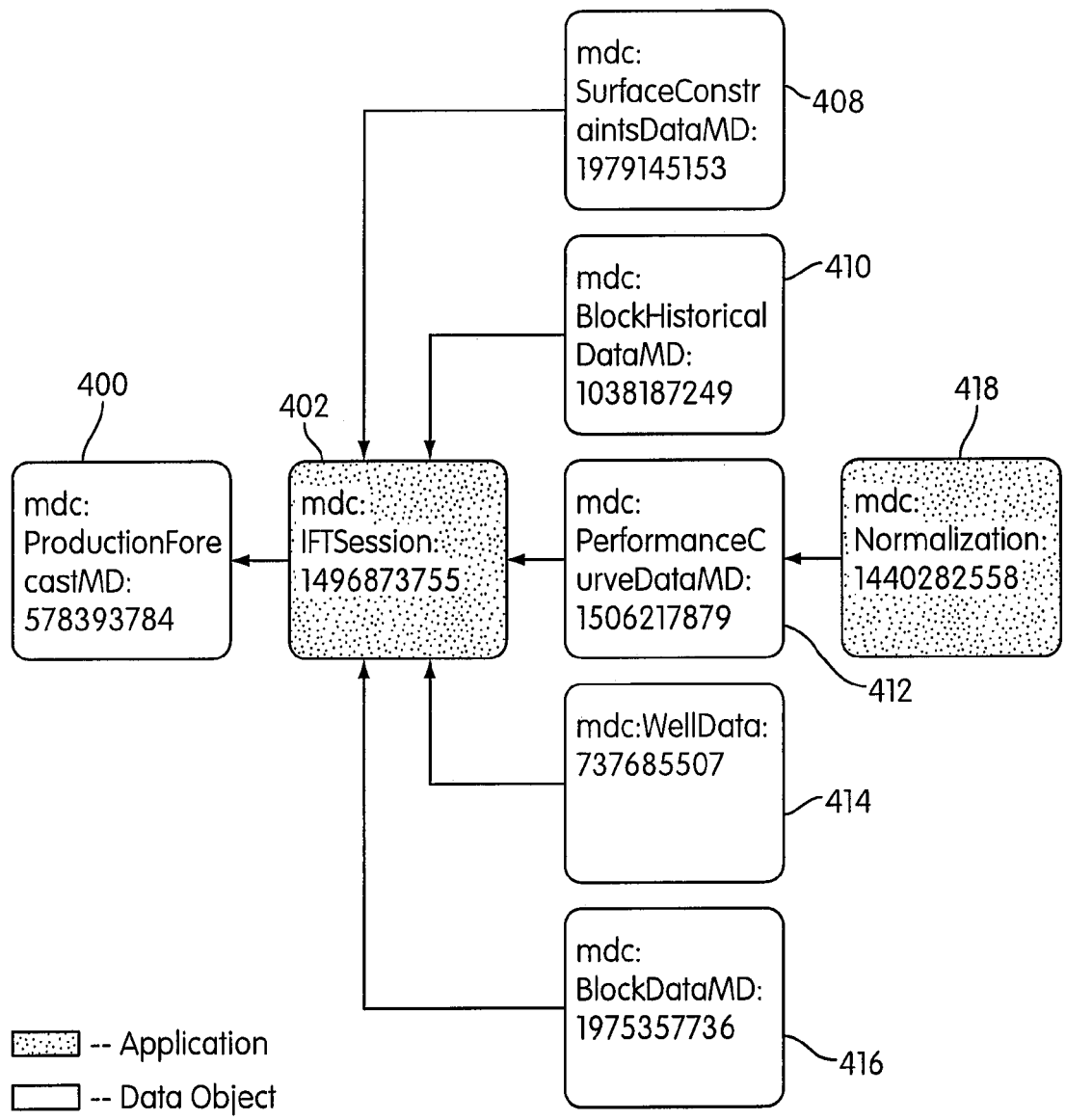

FIG. 4e shows the result of selecting the menu item 406, displaying the five data objects 408-416 that form the basis of the forecasting workflow session 402. In the example, these include surface constraints data 408, block historical data 410, performance curve data 412, well data 414 and block data 416. By repeating the basis inquiry process, the user can determine that the performance curve data 412 is based on a normalization application 418, as shown in FIG. 4f.

Figure 4G:
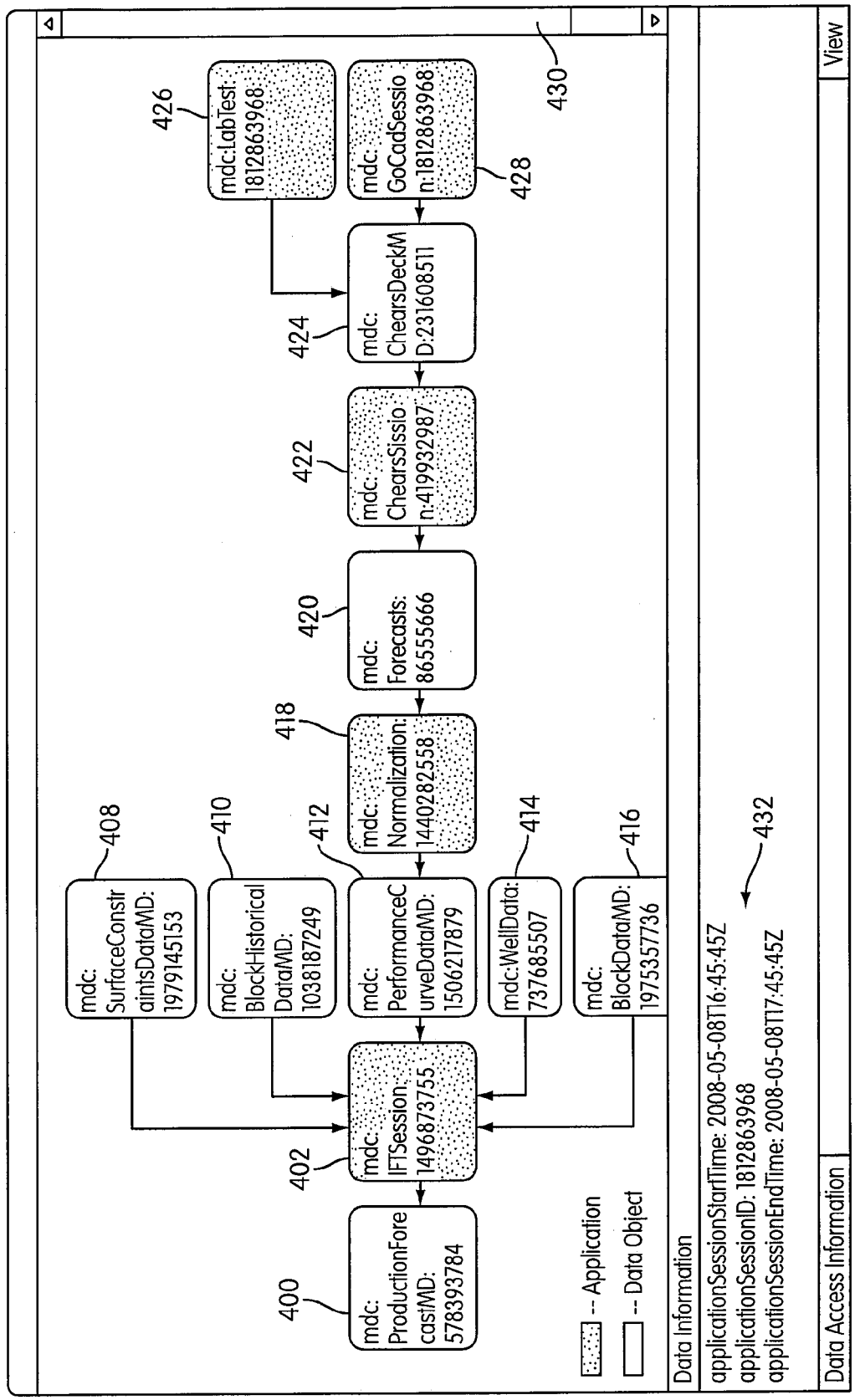

FIG. 4g illustrates a continuation of this process, with the user selecting additional provenance information until reaching the desired end point of the inquiry. As shown, the normalization application 418 takes as an input forecast data 420. The forecast data 420 in turn is derived from a reservoir simulator session 422 (e.g., CHEARS®). The simulator session 422 is, in this case, derived from a formatted data object 424 formatted for use with the specific simulator (a CHEARS deck), while the formatted data object 424 is itself derived from two applications, a lab test 426 and a GoCad session 428. The end point may be, for example, an initial data object that has no further provenance, or simply a point that the user finds sufficient, beyond which he or she does not need to confirm provenance.

As will be appreciated, such a user interface can be implemented using a computer having a user-readable display and user input devices such as a mouse and/or keyboard. The icons shown in FIGS. 4a-4g may be shown in a window 430 as illustrated in FIG. 4g that may include such additional information as session identification information 432 and additional controls for altering aspects of the session such as a view or other parameters.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for deriving data provenance information corresponding to a workflow process, the method comprising:

deriving, on a computing system, internal provenance information for data pertaining to a first workflow process and storing the derived internal provenance information in a data storage device;

deriving, on the computing system, external provenance information for one or more input data objects used by the first workflow process, wherein the one or more input data objects are created by a second workflow process separate from the first workflow process, and storing the external provenance information;

using a provenance index service to integrate the internal provenance information and the external provenance information, the provenance index service comprising at least one of: a data model, a domain model, or a provenance service model;

in response to a user-submitted query received from a user interface, electronically retrieving data provenance corresponding to the user-submitted query from the integrated internal data provenance information for the workflow process using the provenance index service; and outputting the retrieved data provenance information to a user using the user interface.

2. A method as in claim 1, wherein the deriving internal provenance information comprises storing information selected from the group consisting of: workflow settings, intermediate results, and data derivation information.

3. A method as in claim 1, wherein the input data objects comprise output data objects of said second workflow process separate from the first workflow process.

4. A method as in claim 1, wherein, after external provenance information is derived, it is stored for future retrieval in response to future user queries.

5. A method as in claim 1, wherein the using the provenance index service to integrate the internal and external provenance information further comprises:

providing, from a provenance service, the derived, stored internal provenance information;

querying the provenance index service regarding the derived external provenance information;

receiving, at the provenance service and from the provenance index service, a formatted query;

addressing the formatted query to a corresponding different provenance service; and receiving internal provenance information from the corresponding different provenance service.

6. A method as in claim 1, wherein the deriving internal provenance information comprises deriving the internal provenance information from a provenance log of the first workflow process.

7. A method as in claim 1, wherein the deriving internal provenance information comprises deriving the internal provenance information from information relating to inputs and outputs of the first workflow process.

8. A method as in claim 7, wherein the deriving from information relating to inputs and outputs of the first workflow process further comprises applying data relationship extraction rules to logs of the first workflow process to determine relationships between data objects used in the first workflow process.

9. A method for deriving data provenance information in a hydrocarbon block forecasting workflow process having a plurality of lower-level workflow processes including a block history workflow process, a well production workflow process, a recovery curve workflow process and a surface facility constraint workflow process, the method comprising:

deriving, on a computer system, internal provenance information for data pertaining to a first one of the lower-level workflow processes;

storing the derived internal provenance information for data pertaining to the first one of the lower-level workflow process in a relational database comprising a first provenance service;

deriving, on a separate computing system, internal provenance information for data pertaining to a second one of the lower-level workflow processes;

storing the derived internal provenance information for data pertaining to the second one of the lower-level workflow process in a separate relational database comprising a second provenance service separate from the first provenance service;

identifying computer-readable data objects that are shared between the first and second one of the lower-level workflow processes to derive external provenance information for the identified computer-readable data objects;

using a provenance index service to integrate internal provenance information from each of the relational databases and the external provenance information;

in response to a user-submitted query received from a user interface, electronically retrieving data provenance corresponding to the user-submitted query from the integrated internal provenance information from each of the relational databases and the external information using the provenance index service; and outputting the retrieved data provenance information to a user, using the user interface.

10. A method as in claim 9, wherein the deriving internal provenance information comprises deriving internal provenance for well-related workflows.

11. A method as in claim 10, wherein the well-related workflows include a block data workflow process including aggregating well production data from the well production workflow process and the internal provenance information for data pertaining to the block data workflow process includes provenance information pertaining to the well production data.

12. A method as in claim 9, wherein when either the first or second lower-level workflow process comprises a block forecasting workflow, the storing includes storing intermediate results of the block forecasting workflow as internal provenance information for the block forecasting workflow.

* * * * *